Aug. 8, 1939.  P. A. PENNOCK  2,168,492
VEHICLE SIGNALING MECHANISM
Filed Feb. 5, 1936   3 Sheets-Sheet 1
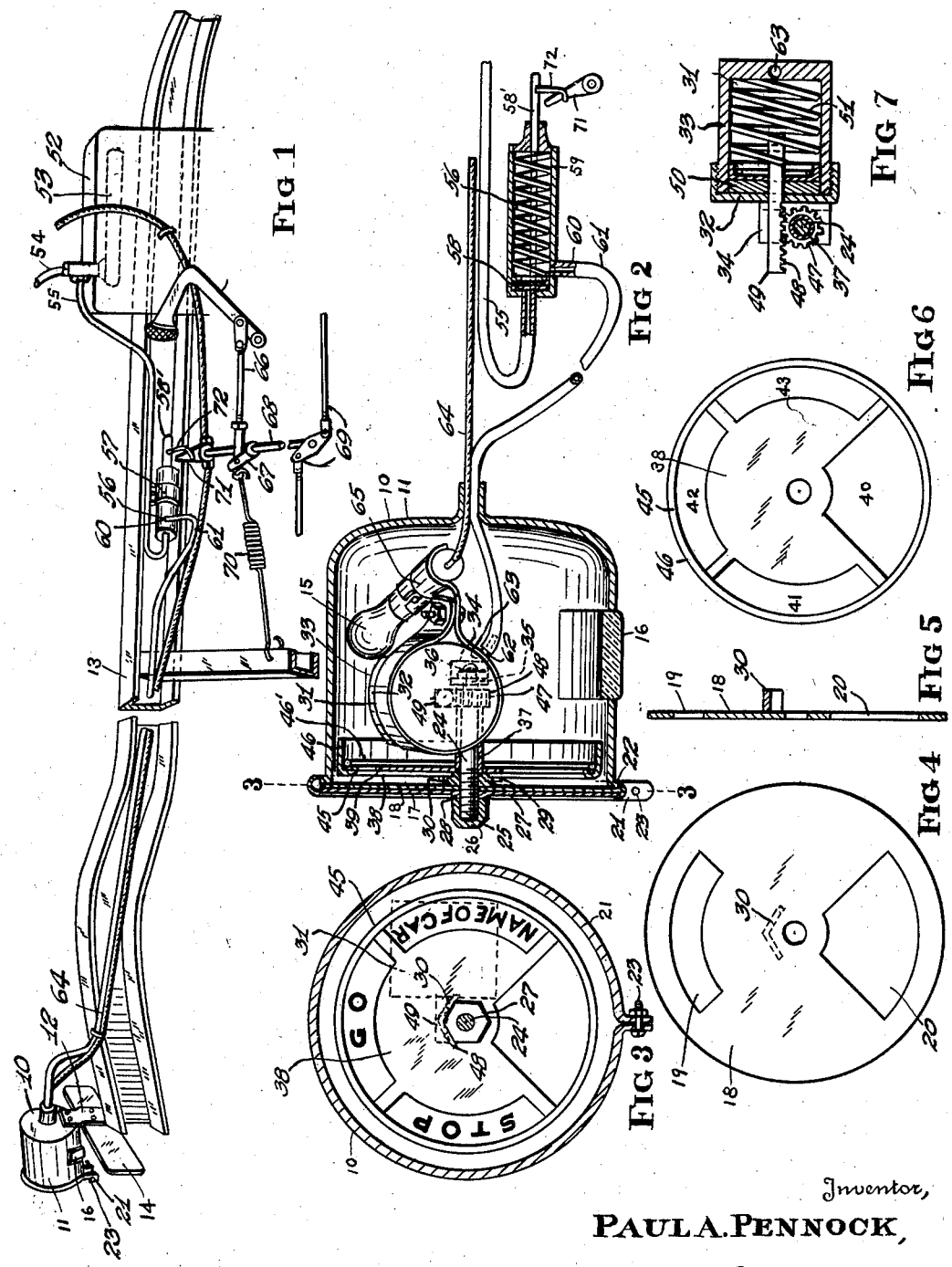
Inventor,
PAUL A. PENNOCK,
By M. E. Jones
His Attorney.

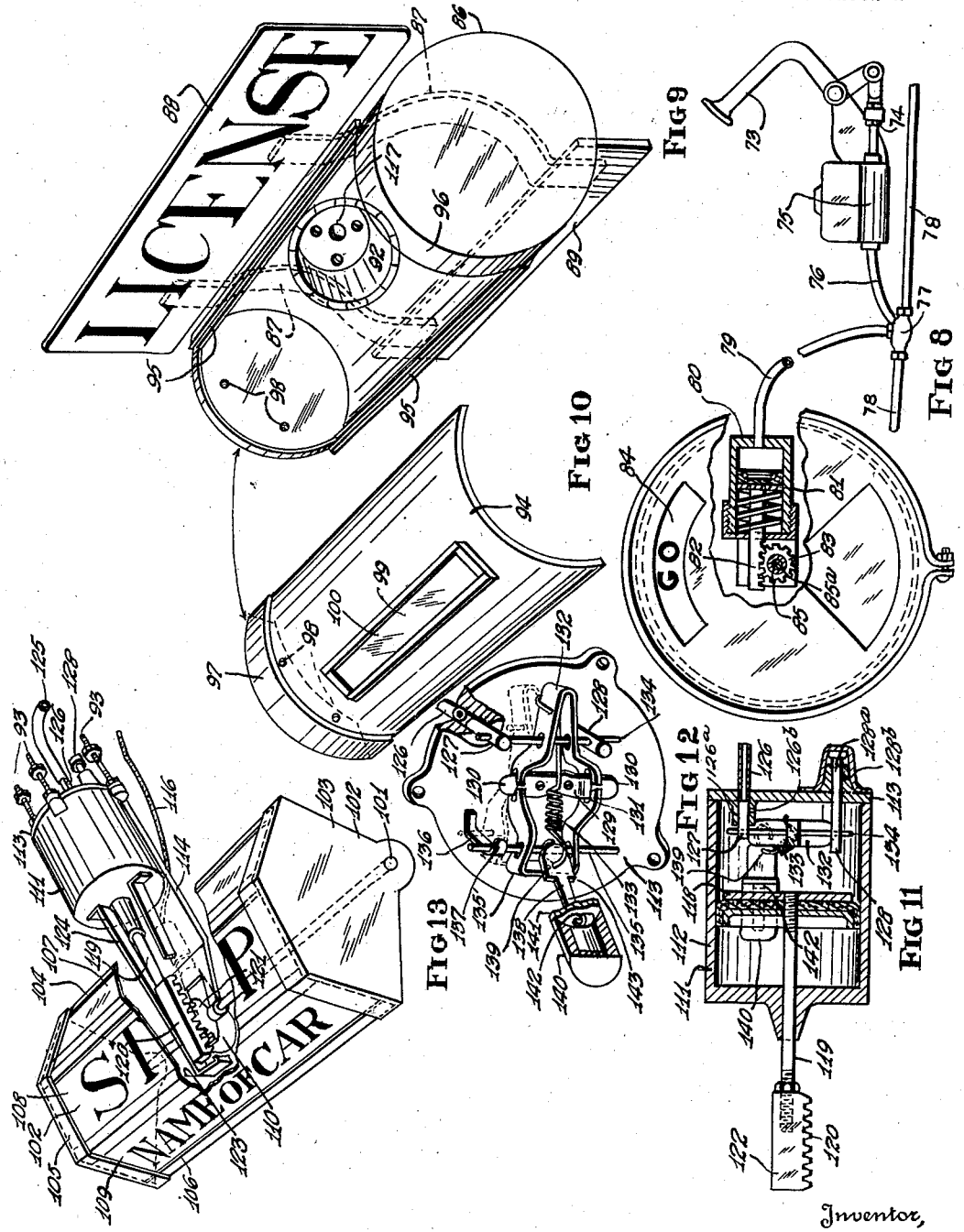

Aug. 8, 1939.  P. A. PENNOCK  2,168,492
VEHICLE SIGNALING MECHANISM
Filed Feb. 5, 1936  3 Sheets-Sheet 3

Inventor,
PAUL A. PENNOCK,
By
His Attorney.

Patented Aug. 8, 1939

2,168,492

UNITED STATES PATENT OFFICE 2,168,492

VEHICLE SIGNALING MECHANISM

Paul A. Pennock, Jamestown, N. Y.

Application February 5, 1936, Serial No. 62,521

3 Claims. (Cl. 116—39)

This invention relates to signaling mechanism particularly adapted for use on automobiles or other self-propelled vehicles and especially useful on school buses, police cars, ambulances, fire engines or the like which are permitted to travel at a high rate of speed.

One important object is to provide such a construction as may be operated by the vacuum or suction within an internal combustion engine, particularly from the intake manifold.

It is also aimed to provide such a device as may be oscillated or operated continuously or only at times as preferred and which may incorporate an advertising function.

The more specific objects and advantages will become apparent from a consideration of the accompanying drawings, embodying suggested embodiments, and taken in connection with the following description.

In said drawings:

Figure 1 is a perspective view showing an automobile chassis fragmentarily, with one form of the invention applied thereto;

Figure 2 is a view primarily in longitudinal, vertical section through the signal device and associated parts;

Figure 3 is a vertical section taken substantially on the plane of line 3—3 of Figure 2;

Figure 4 is an end elevation of the outer plate of the signal device;

Figure 5 is a central vertical sectional view through the outer plate of the signal device;

Figure 6 is an elevation of the signal holder;

Figure 7 is a longitudinal sectional view through the suction motor employed;

Figure 8 is a view partly in elevation and partly in section of a modified form operable from the hydraulic brake system of the automobile;

Figure 9 is a perspective view of the casing or box for a further modified form;

Figure 10 is a perspective view of the closure for the part of Figure 9;

Figure 11 is a longitudinal sectional view through the motor of the form of Figure 9;

Figure 12 is a perspective view of the control mechanism for the motor of Figure 11;

Figure 13 is a perspective view of the last form of signal and associated parts.

Figure 14:
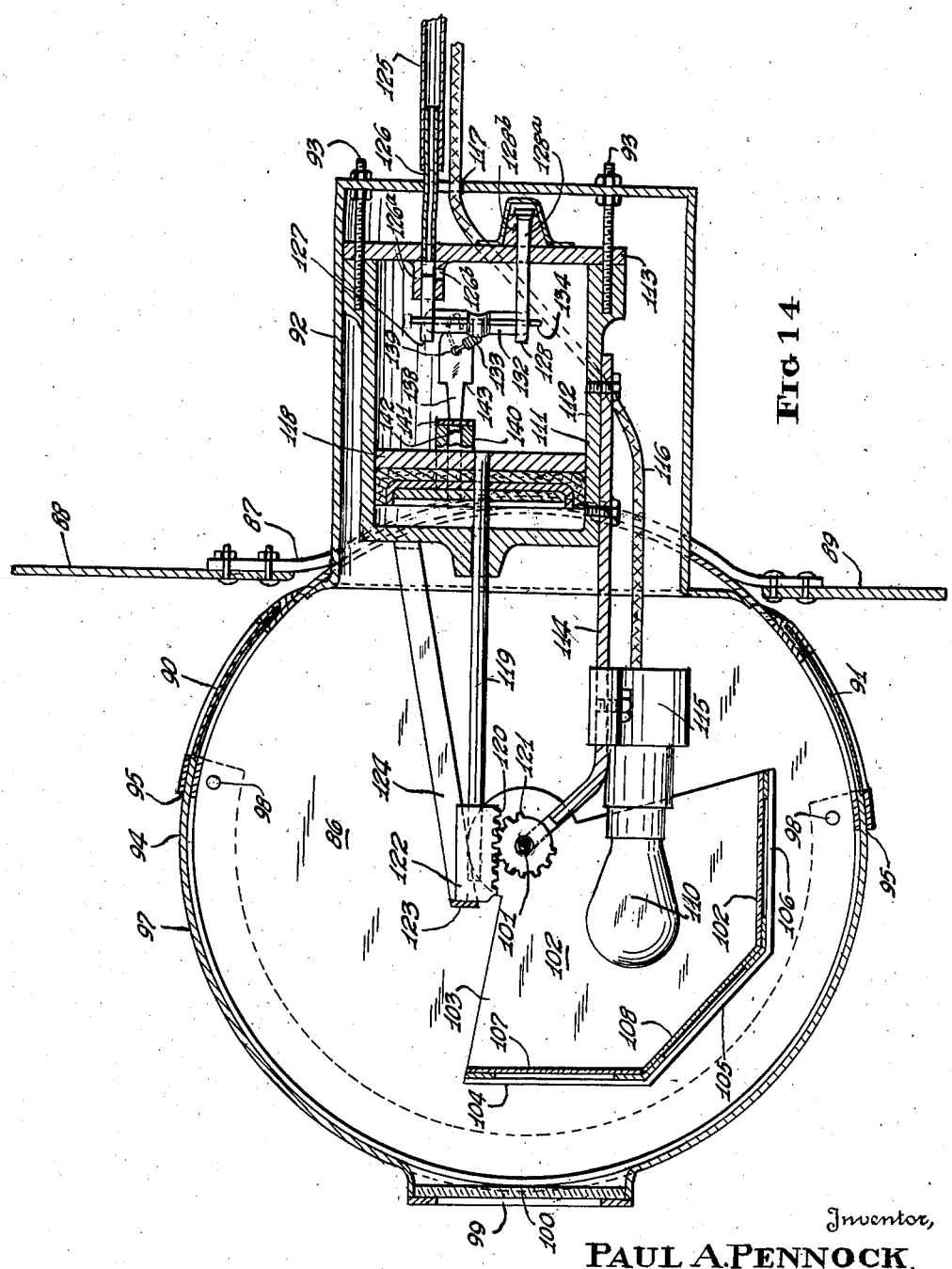
Figure 14 is a longitudinal section view through the last mentioned form of the invention.

Referring specifically to the drawings wherein like reference characters designate like or similar parts, 10 generally designates a signal device adapted to be mounted at the rear of an automobile for observation by adjacent traffic. Such signal device has a casing 11 of any suitable shape which is preferably open at the front. For example, said casing may be fastened to a plate or bracket 12 attached to a side beam or other part of an automobile or its chassis 13. Said bracket 12 may also mount a license plate 14 adapted to be illuminated by a lamp 15 within the casing through a window 16 in the wall of the casing.

Across the front of box or casing 11 is a removable glass, Celluloid or other transparent disk or plate 17 and removably disposed thereover is a cover plate or disk 18, preferably of metal or opaque material which has openings 19 and 20 therethrough for the display of signal indicia. Said disks 17 and 18 are rigidly secured to the box or casing 11 by a clamping ring 21 which also embraces a marginal flange 22 on the casing, and which clamp is of the split type having a securing bolt 23 so that it may be removed and replaced.

Rigidly but removably carried by the cover plate or disk 18, is a shaft 24. That shaft has a screw-threaded portion 25 which extends through an opening in the plate 18 and is engaged by nuts 26 and 27 clamped against the plate 18 and plate 17, respectively. A washer 28 is preferably interposed between nut 26 and plate 18 and a pin or key 29 is removably driven friction-tight through openings in nut 27 and shaft 24 and to further guard against accidental displacement of the parts, a V-shaped or other lug extends inwardly at 30 from the cover plate, and intimately engages two sides of the nut 27 across the path of removal of said pin or key 29.

A vacuum operating motor for the signal is located at 31 within the signal box or casing and on a closure or removable end wall 32 for the cylinder 33 thereof, has a bracket 34 to which a screw-threaded stud 35 of stationary shaft 24 is rigidly fastened by a nut 36.

Journalled on said shaft 24, between bracket 34 and nut 27 is a sleeve 37 forming an integral or rigid part of a plate-like holder 38 for a signal element 39. Said holder 38 has segmental openings therethrough at 40, 41, 42 and 43. Signal element 39 is made of any suitable diaphanous material and has delineated thereon the words "stop", "go" and "name of car" or the equivalent, normally respectively aligned with the openings 41, 42 and 43. Normally the word "go" may be observed through the opening 19 of the cover plate and no indicia appears through the opening 20 of the same place. Through means now to be described, associated with motor 31, holder 38 and signal element 39 are adapted to be rocked or rotated to and from a position which displays "stop" at the opening 19 and "name of car" at the opening 20, through the application and release of the brake pedal of the automobile, conventionally shown at 44.

Said holder 38 has a marginal curved portion 45 and an annular rim 46 positioning the signal element 39 and the latter is removably clamped therein by a split wire ring or equivalent at 46'.

A gear or pinion 47 carried rigidly on the sleeve 37 is enmeshed with the teeth 48 of a rack bar 49, carried by a suitable piston 50, which rack bar is slidable in an opening in wall 32. An expansive coil spring 51 within the cylinder 33, urges the piston 50 into contact with said wall 32 and normally maintains it in that position.

Advantage is taken of the vacuum or suction produced by the operation of the propelling engine of the automobile which is generally suggested at 52. From the intake manifold 53 of the latter, pipes or tubes 54 and 55 lead, the former operating any desired accessory such as a windshield wiper and the latter leading to one end of a cylinder 56 fastened to the automobile chassis as at 57. Cylinder 56 contains a control valve or piston 58 normally closing such cylinder to the action of the vacuum or suction. Valve or piston 58 has a rod 58' extending exteriorly of the cylinder 56 and an expansive coil spring 59 within said cylinder normally maintains valve 58 closed and urges it to closed position. To an outlet nipple 60 on cylinder 56, a flexible tube 61 is connected which is also connected to a nipple 62 on motor cylinder 33 communicating with the interior of the latter through a passage 63 in the wall of such cylinder 33. Tube 61 extends through the same opening in box or casing 11 as does a conductor 64 which supplies the lamp 15 with current from any suitable source. Said lamp is shown as mounted by a bracket 65 fastened to said cylinder 33. Thus, it will be realized that all parts within the box or casing 11 are unitarily mounted or connected together so that they may be removed or replaced through the application or removal of ring clamp 21.

The device is operated by depressing the brake pedal 44. As the latter moves, through a link 66, it applies the brakes of the automobile as it is connected to a crank 67 on a transverse rockshaft 68 connected to the conventional brake mechanism 69, the rod being maintained in a predetermined or retracted position by a contractile spring 70 connected to crank 67 and to the chassis. Through such depression of the brake pedal 44, a crank 71 on shaft 68 engages a lug 72 on the rod 58' which moves valve 58 forwardly past outlet 60 and hence there is a line of suction or vacuum created in the device from the engine 52, through pipe 55, cylinder 56, pipe 61, nipple 62, passage 63 and cylinder 33, drawing piston 50 and rack bar 49 to the rear, which causes teeth 48 to turn pinion 47 and accordingly the signal holder 38 and signal element. As a result, "go" which normally appears at opening 19, is shifted 90° to the right, and "stop" appears at opening 19 and "name of car" appears at opening 20, and this condition exists until brake pedal 44 is released, whereupon the suction or vacuum is cut off by spring 59 restoring valve 58 to closed position and spring 51 restoring the holder and signal to normal position, any retarding air within the cylinders 56 and 33 bleeding along the pistons and rods thereof to the atmosphere.

The signal device of the form of Figures 1 to 7 may be operated by means other than the suction or vacuum of the engine if desired. For instance, the same may be operated from a hydraulic brake system, when the automobile employs such a system as suggested in Figure 8. In this modified form, a depressible foot brake lever 73 has a connection 74 with the control device 75 of the hydraulic brake system, from which device 75 a pipe 76 at a coupling 77 connects with fluid-applying conduits 78 leading to the brakes according to conventional structure. A branch pipe 79 leads from coupling 77 to a motor 80 through which pipe 79 the brake fluid is forced and retracted to actuate the piston 81 of that motor and in turn, through a rack bar 82 and gear 83, operate a rotatable signal device 84, corresponding to that of the preceding form, the stationary shaft 85 corresponding to the shaft 24 and having a sleeve 85ª thereon carrying gear 83.

Referring now to the form of Figures 9 to 14, the signal operates or oscillates or rocks on a horizontal axis disposed transversely of the automobile rather than longitudinally thereof as in the previous forms. This final form of the invention has a casing or box 86, preferably cylindrical, adapted to be mounted in any suitable manner on the automobile and having straps 87 connected thereto which mount a license plate 88 and an auxiliary license plate 89, the former and latter being arranged for illumination from the interior of casing 86 through windows 90 and 91, respectively. Such casing 86 preferably has an enlargement 92 at the rear end thereof whose end wall may be fastened to the automobile by means of bolts 93. An open portion of the casing 86, best shown in Figures 9 and 14, is normally closed by a removable closure 94 as detailed in Figure 10. The longitudinal edges of closure 94 engage grooves 95 at the edge portions about said open portion of the casing, with one end of the closure underlapping a rim 96 on the casing, and the other end of the closure carrying a rim portion 97 adapted to overlap and at 98 be fastened removably to the adjacent end wall of said casing 86. Closure 94 has a window 99 preferably covered by a transparent plate 100 through which the signal may be viewed.

Disposed in casing 86 is a signal frame 103 having a longitudinally extending shaft 101 to which the end walls 102 of such signal frame 103 are rigidly fastened. The frame 103 has three walls 104, 105 and 106 disposed at angles to each other behind which signal elements are removably fastened in any suitable manner, at 107, 108 and 109, respectively, all of such elements being diaphanous. Signal element 107 is preferably of red glass or red Celluloid so that the device will normally constitute a tail light when the device is illuminated as by a lamp 110, since the wall 104 is vertical when the device is at rest, as indicated in Figure 14. The diaphanous sheets or plates 108 and 109 respectively have delineated thereon "stop" and the name of the automobile, so as to be read through the window plate 100 as the frame is operated to bring such words in registry with said plate 100.

The aforesaid casing enlargement 92 houses an operating motor 111 for the signal frame. Said motor has a cylinder 112 and a removable end plate 113, connected together and mounted by inward extensions of the bolts 93. Fastened to the under surface of cylinder 112 is a bracket 114 in the forward end of which the aforesaid shaft 101 is journalled. A clamp 115 on said bracket 114 secures the lamp 110 in place and current for the latter is supplied from any suitable source through a conductor 116 passing through an opening 117 in the casing enlargement 92.

A suitable piston 118 is reciprocable in cylinder 112 and normally is at the forward end thereof. A rod 119 extends forwardly from said piston 118 having rack teeth 120 enmeshed with a gear or pinion 121 rigid on the shaft 101. The forward end of rod 119 or portion 122 on which teeth 120 are provided is normally adapted to rest against a bumper 123 forming part of a frame 124 extending forwardly from the front end wall of the cylinder 112. Piston rod 119 passes slidably through the said front end wall.

Said piston 118 is adapted to be actuated by means of any power fluid. It is shown, for example, as operable by suction or vacuum from the operation of the propelling internal combustion engine of the automobile as in the case of the form of Figures 1 to 7. To this end a tube or pipe 125 is connected to a nipple 126 passing through enlargement 92 and fastened to the cylinder at end plate 113. Said pipe or tube 125 is connected to the intake manifold of the engine or otherwise for producing a suction or vacuum therethrough. A boss 126ᵃ on end plate 113 communicates with tube 126 and has a port 126ᵇ therethrough.

Associated with said end plate 113 are valves 127 and 128, adapted one to open as the other is closed and vice versa. Valve 127 controls suction or vacuum through the nipple 126 and accordingly the motor 111. A bracket 129 is fastened to and with free end portions 130 spaced from end plate 113, with bifurcated ends 131 of U-shaped levers 132, 135′ in pivotal engagement with said end portions 130 and so held by a contractile spring 133 connected at opposite ends to vertical rods 134 and 135. Rod 134 is carried by lever 132 and such rod 134 is also connected to and operates valves 127 and 128. Rod 135 is carried by lever 135′ and it is associated with a bracket 136 on said end plate 113, having lugs 137 limiting the movement of the lever 135′. One end of a hook element 138 is surrounded by the lever 135′ and that portion of the spring 133 engaging rod 135, passes at 139 through the element 138. Part of hook element 138 is disposed within a chamber member 140 carried by piston 118. At the open end of chamber member 140 is a projection 141 which is engageable by the hook 142 of hook element 138 adjacent the end of the inward stroke of piston 118 to close valve 127 and open valve 128, while such hook element 138 is adapted to abut the closed end of chamber member 140 adjacent the end of the outer stroke of piston 118 to open valve 127 and close valve 128. Valve 128 has a tapered portion 128ᵃ which intimately fits a tapered seat 128ᵇ. When valve 128 is open it is loose in its seat 128ᵇ to break the vacuum.

In the operation of this final form of the invention starting from normal position as in Figure 14 with panel 107 constituting a tail light signal viewed through window glass 100, vacuum or suction through pipe 125 and nipple 126 draws piston 118 to the right in Figure 14 and causing teeth 120 to turn pinion 121 and frame 103 with which it is rigid in an upward direction until the position of Figure 13 is reached, such frame 103 during said movement successively displaying "stop" and the name of the automobile at the window glass 100. Adjacent the end of such movement chamber member 140 engages a shoulder 143 on hook member 138 pressing it toward plate 113 to such an extent that the levers 132 and 135′ move past dead center, moving vertical rods 134 and 135 toward plate 113 and thereby opening valve 128 to establish communication with the atmosphere while closing valve 127 to break the suction or vacuum. The spring 133 snaps the levers 132 and 135′ into such position, as dead center is passed. The weight of the parts especially at the frame is sufficient to fall or return to normal position upon the said closing of valve 127 during which return movement the "stop" and tail light signals are successively displayed. Also during such return or lowering movement of the signal frame 103, gearing 121 and 120 draws rod 119 and piston 118 away from plate 113 with projection 141 on chamber member 140 engaging the hook 142 adjacent the end of such movement, thus drawing lever 135′ back to normal position and when past dead center the spring 133 snaps both levers 132 and 135′ into normal position. The final form is thus adapted for operation with the tail light, "stop" and name of the car successively displayed on each upward movement of the signal frame and such signals in the reverse order displayed on the downward or return movement of such frame. Because of this action, the structure is particularly adapted for use on automobiles which travel at a rate of speed higher than normal, for instance, police vehicles and ambulances, although it is to be understood that pipe 125 need not be constantly subject to suction or vacuum but may be intermittently so subjected, or operated in any suitable manner.

Various changes may be resorted to provided they fall within the spirit and scope of the invention.

I claim as my invention:

1. An automobile signaling structure having a casing provided with a window at one side thereof and having an enlargement projecting beyond the other side thereof, an operating motor mounted in said enlargement, a bracket supported at one end by said motor and having a distal end portion extending from said motor into the casing, a signaling frame within the casing having indicia for display at said window, a shaft rigid with said frame, said shaft being disposed longitudinally of the casing at an angle to the bracket and journalled on said distal end portion of the bracket, a rod reciprocable by said motor in a path at an angle to said shaft, said rod extending into the casing, and gearing between said rod and said shaft to operate said frame to move said indicia to and from registry with said window.

2. An automobile signaling structure according to claim 1 including a bumper for said rod, said bumper extending from the motor and being located in the casing, a piston in said motor operating said rod, a chamber member on said piston, a hook member partly telescoped in said chamber member and operable by the latter at opposite extremes of movement of the piston, operation-controlling valve mechanism to open and close through the movement of the hook member, and a spring to snap said valve mechanism from open to closed position and vice versa.

3. An automobile signaling structure having a casing provided with a window and with an enlargement, an operating motor located in said enlargement, a bracket extending forwardly from said motor into the casing, a signaling frame within the casing having indicia for display at said window, a shaft rigid with said frame journaled on said bracket, a rod operable by said motor, gearing between said rod and said shaft to operate said frame, a bumper for said rod, said bumper being located in the casing and extending from said motor, a piston in said motor operating said rod, a chamber member on said piston, a hook member partly telescoped in said chamber member and operable by the latter at opposite extremes of movement of the piston, operation-controlling valve mechanism to open and close through the movement of the hook member, and a spring to snap said valve mechanism from open to closed position and vice versa.

PAUL A. PENNOCK.